United States Patent
Sartain et al.

(10) Patent No.: US 9,568,205 B2
(45) Date of Patent: Feb. 14, 2017

(54) SELECTIVELY CONNECTING A CLIMATE CONTROL SYSTEM CONTROLLER WITH MORE THAN ONE DESTINATION SERVER

(71) Applicant: Emerson Electric Co., St. Louis, MO (US)

(72) Inventors: John M. Sartain, St. Louis, MO (US); Rishi Siravuri, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 341 days.

(21) Appl. No.: 14/159,330

(22) Filed: Jan. 20, 2014

(65) Prior Publication Data
US 2015/0204558 A1 Jul. 23, 2015

(51) Int. Cl.
| | |
|---|---|
| *H04L 12/28* | (2006.01) |
| *F24F 11/00* | (2006.01) |
| *G05B 15/02* | (2006.01) |
| *H04W 4/00* | (2009.01) |

(52) U.S. Cl.
CPC ............ *F24F 11/006* (2013.01); *G05B 15/02* (2013.01); *H04L 12/2816* (2013.01); *H04W 4/008* (2013.01); *F24F 2011/0071* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 6,598,056 B1 | 7/2003 | Hull et al. | |
| 7,434,742 B2 * | 10/2008 | Mueller | F24F 11/0012 236/46 C |
| 8,091,795 B1 | 1/2012 | McLellan et al. | |
| 2006/0283965 A1 * | 12/2006 | Mueller | F24F 11/0012 236/51 |
| 2009/0099699 A1 * | 4/2009 | Steinberg | F24F 11/006 700/278 |
| 2009/0254971 A1 | 10/2009 | Herz et al. | |
| 2010/0063644 A1 | 3/2010 | Kansal et al. | |
| 2010/0083356 A1 | 4/2010 | Steckley et al. | |
| 2010/0282857 A1 * | 11/2010 | Steinberg | F24F 11/006 236/49.3 |
| 2011/0015802 A1 * | 1/2011 | Imes | G05D 23/1923 700/300 |
| 2011/0061014 A1 | 3/2011 | Frader-Thompson et al. | |
| 2011/0063126 A1 | 3/2011 | Kennedy et al. | |

(Continued)

FOREIGN PATENT DOCUMENTS

| | | |
|---|---|---|
| EP | 1 587 292 | 7/2011 |
| WO | WO2004/044753 | 5/2004 |

*Primary Examiner* — Isaac T Tecklu
(74) *Attorney, Agent, or Firm* — Harness, Dickey & Pierce, P.L.C.

(57) ABSTRACT

Disclosed are exemplary embodiments of controllers and methods for controlling a climate control system. In an exemplary embodiment, a climate control system controller for controlling operation of a climate control system of a structure generally includes a processor, memory, and network interface configured to provide the climate control system controller with wireless network connectivity. The climate control system controller is selectively connectable, in response to user input, with each of a plurality of destination servers remote from the structure.

19 Claims, 2 Drawing Sheets

(56) References Cited

U.S. PATENT DOCUMENTS

Figure 1:
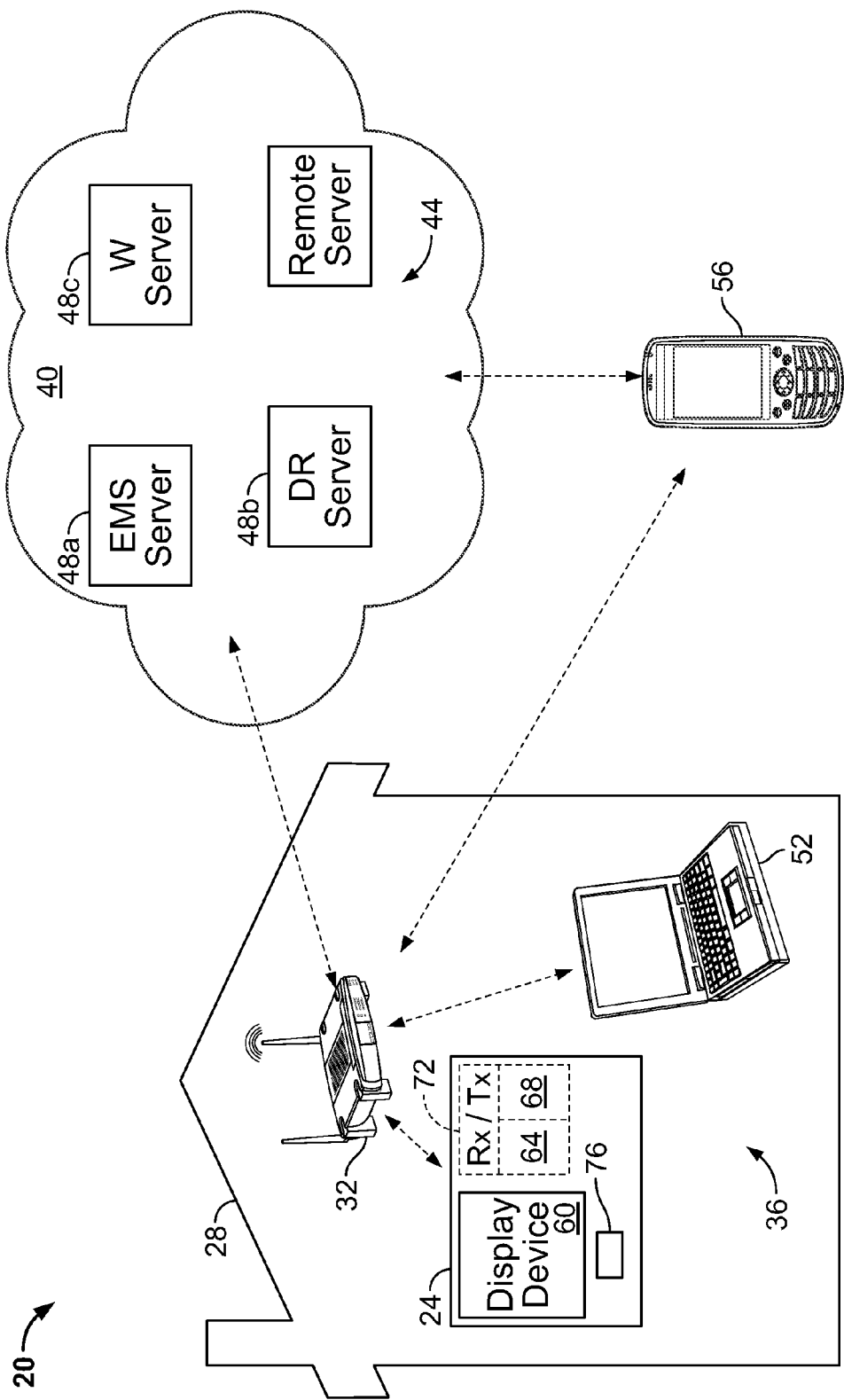

| | | | |
|---|---|---|---|
| 2011/0202181 A1* | 8/2011 | Lee | F24F 11/0009 700/276 |
| 2011/0290893 A1* | 12/2011 | Steinberg | F24F 11/0034 236/49.3 |
| 2012/0065783 A1 | 3/2012 | Fadell et al. | |
| 2012/0069131 A1 | 3/2012 | Abelow | |
| 2012/0179297 A1* | 7/2012 | Jung | F24F 11/006 700/276 |
| 2012/0232969 A1* | 9/2012 | Fadell | G06Q 10/20 705/14.4 |
| 2012/0323393 A1* | 12/2012 | Imhof | G05B 15/02 700/297 |
| 2013/0030589 A1 | 1/2013 | Pessina et al. | |
| 2013/0090767 A1* | 4/2013 | Bruck | F24F 11/0086 700/276 |
| 2013/0095459 A1 | 4/2013 | Tran | |
| 2013/0097664 A1 | 4/2013 | Herz et al. | |
| 2013/0325997 A1 | 12/2013 | Higgins et al. | |
| 2014/0058567 A1* | 2/2014 | Matsuoka | G05D 23/1917 700/276 |
| 2015/0195671 A1* | 7/2015 | Seed | H04L 67/16 455/434 |

* cited by examiner

SELECTIVELY CONNECTING A CLIMATE CONTROL SYSTEM CONTROLLER WITH MORE THAN ONE DESTINATION SERVER

FIELD

The present disclosure generally relates to climate control systems, and more particularly (but not exclusively) to selectively connecting a climate control system controller such as a thermostat with more than one destination server.

BACKGROUND

This section provides background information related to the present disclosure which is not necessarily prior art.

Climate control systems may be configured to conserve energy through participation in local, regional, and/or utility demand response programs. When a climate control system is included in such a program, a thermostat or other controller of the climate control system may communicate with a utility or other energy provider and may modify climate control settings in response to real-time changes in energy demand.

SUMMARY

This section provides a general summary of the disclosure, and is not a comprehensive disclosure of its full scope or all of its features.

According to various aspects, exemplary embodiments are disclosed of controllers and methods for controlling a climate control system. In an exemplary embodiment, a climate control system controller for controlling operation of a climate control system of a structure generally includes a processor, memory, and network interface configured to provide the climate control system controller with wireless network connectivity. The climate control system controller is selectively connectable, in response to user input, with each of a plurality of destination servers remote from the structure.

In another exemplary embodiment, a computer-performed method of controlling a climate control system is provided. The method generally includes receiving a user selection of one of a plurality of remote destination servers with which a climate control system controller is configured to establish and/or terminate connections, and in accordance with the user selection, establishing or terminating a connection between the selected destination server and the climate control system controller.

In another exemplary embodiment, a thermostat is provided for controlling operation of a climate control system of a structure. The thermostat generally includes a processor, memory, and network interface configured to provide the thermostat with wireless network connectivity with a plurality of destination servers, such that the thermostat: (a) in response to user input selecting one of a plurality of features and/or functions of the thermostat, is connectable with a first destination server that provides the selected feature and/or function, and (b) is selectively disconnectable from a second destination server providing another of the plurality of features and/or functions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
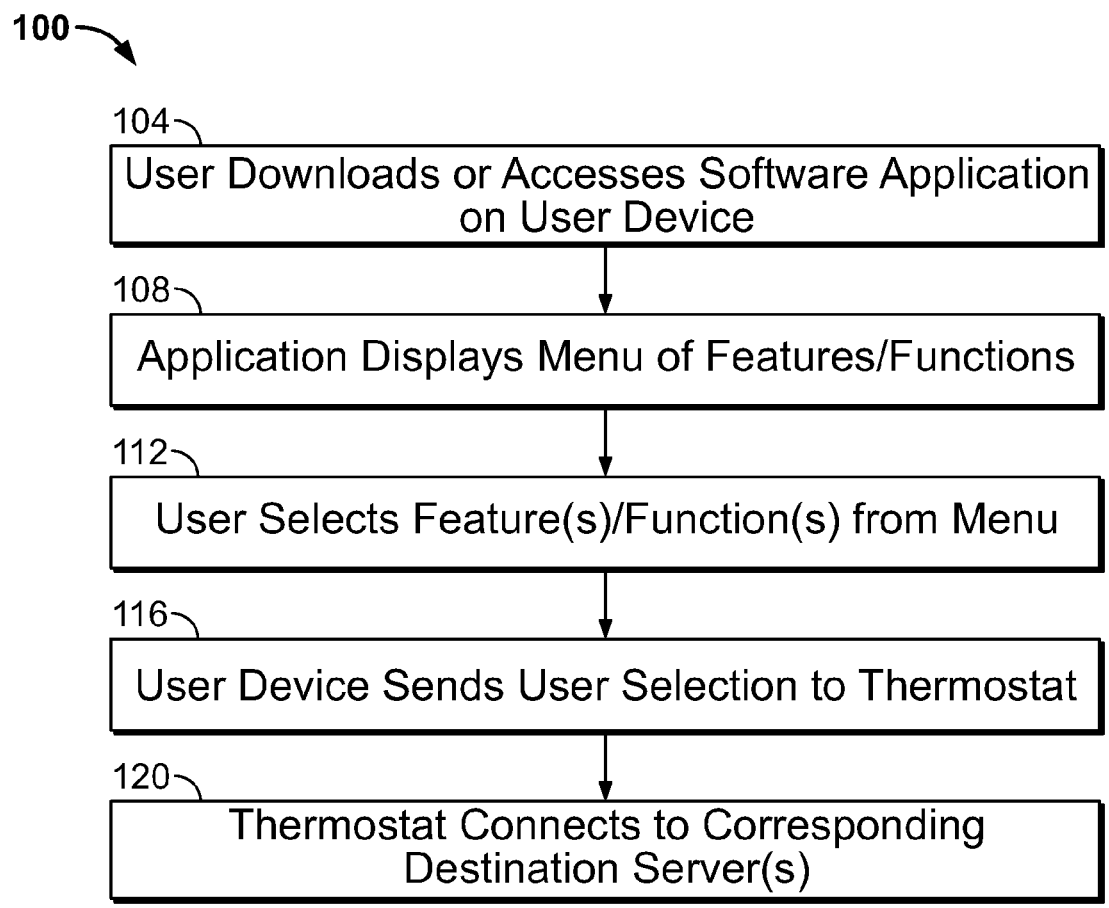

FIG. 1 is a diagram of a system for energy management in accordance with an example embodiment of the present disclosure; and FIG. 2 is a flow diagram of a method of providing a thermostat with a capability for connecting with and/or disconnecting from destination server(s) in accordance with an example embodiment of the present disclosure.

DETAILED DESCRIPTION

Example embodiments will now be described more fully with reference to the accompanying drawings.

The inventors hereof have recognized that in order to provide demand response capability in a home climate control system, a thermostat or other controller of the climate control system may be connected via the Internet with a utility demand response automation server. The connection is typically through a homeowner's home area network. The homeowner, however, may wish to employ a networking thermostat for additional purposes, e.g., to control the climate control system remotely by the user's smart phone, to communicate with an energy management service provider, to obtain weather reports, etc. Furthermore, the homeowner may not always wish to participate in demand response (DR) programs.

Accordingly, the inventors have developed and disclose herein exemplary embodiments of a controller (e.g., a thermostat, etc.) for controlling operation of a climate control system of a structure. The controller includes a processor, memory, and network interface configured to provide the controller with wireless network connectivity. Based on user input, the controller is connectable with each of a plurality of destination servers remote from the structure. In various embodiments, a user can selectively initiate, retain, or disable a controller's (e.g., thermostat's) connection to a demand response server while selectively initiating, retaining, or disabling connection(s) between the controller and other destination server(s) that provide other features and/or functions to and/or through the controller.

With reference to the figures, FIG. 1 is a diagram of an exemplary system 20 for energy management embodying one or more aspects of the present disclosure. A controller, e.g., a wireless-enabled thermostat 24, is installed in a structure 28, e.g., a residence, and is used for controlling a climate control system of the structure 28. The climate control system may be used to heat and/or cool the structure 28 through operation of various climate control components (not shown.) Such components may include other or additional controller(s), e.g., a furnace controller, compressor controller, heat pump controller, etc. It should be understood that although various embodiments are described with reference to a thermostat, aspects of the disclosure may be implemented in relation to other or additional climate control system controllers. Additionally or alternatively, embodiments are possible in relation to most if not all network-connected energy management devices.

In the present example embodiment, the thermostat 24 includes a display device 60, a processor 64, memory 68, and a network interface 72. The network interface 72 enables the thermostat 24 to receive information from external and/or remote location(s), e.g., for display on the display device 60 and/or for use in controlling the thermostat 24. In various embodiments, the network interface 72 may be a wireless LAN/modem network interface. In some embodiments, the network interface 72 may provide access point (AP) capability. Various embodiments also may include at least some wired connections. In a given connection, the network interface 72 provides a binary MAC number for identifying the thermostat 24 and provides Transport Control Protocol and Internet Protocol (TCP/IP) for accessing an internet URL. In the present example embodiment, the thermostat 24 also includes user input means 76 that may include, e.g., button(s), key(s), manually operable switch(es), a touch pad, etc. The thermostat display device 60 is capable, e.g., of displaying user-specified information such as weather forecast information and/or temperature overrides, which may be received from an Internet website and/or server external from the thermostat 24. The processor 64 may be configured to periodically request a connection via the network interface 72 to a server in an external location and/or to a wide-area network 40, e.g., the Internet and/or cellular network(s), for accessing a website and retrieving user-specified information.

An access point/router 32 is provided in a local network 36, which in the present example embodiment is a user's home network. The access point/router 32 provides wireless access by the thermostat 24 through the home network 36 to the wide-area network 40. The thermostat 24 is wirelessly connectable, e.g., through the access point/router 32, with a plurality of remote servers 44, including a plurality of destination servers 48a-48c referred to collectively by reference number 48. The term "destination server" is used herein and in the claims to refer to a server that may provide a particular capability, feature, and/or function to the thermostat 24 and that has a network address pre-designated in the system 20 for provision to the thermostat 24 and whereby the thermostat 24 may connect with that server.

In the present example embodiment, the destination server ("EMS server") 48a may provide energy management services in relation to the structure climate control system and thermostat 24, to a user, e.g., an owner of the structure 28 who establishes a user profile with the provider of the energy management services. The user may wish to establish a user profile, e.g., so that specific energy-related information might be retrieved and stored in memory in an external location, e.g., on or through the EMS server 48a. Various energy management services could be provided, e.g., via the thermostat 24, a computer 52 in the home network 36 and/or through one or more remote user devices 56, e.g., a smart phone. User device(s) 56 may include (without limitation) mobile device(s) such as an I-Pad®, a cellular or mobile phone, a smart phone such as a Blackberry®, an Android® device, an I-Phone®, etc., that can communicate using wireless communication, including but not limited to Wi-Fi, 802.11-based, WiMAX, Bluetooth, Zigbee, 3G, 4G, subscriber-based wireless, PCS, EDGE, and/or other wireless communication means, or any combination thereof.

Where, e.g. an owner of the structure 28 has registered the thermostat 24 with a utility company or other energy provider, the energy provider may make the destination server ("DR server") 48b available to provide the thermostat 24 with demand response (DR) capability. For example, the DR server 48b may be operable by the energy provider to transmit DR event information to the thermostat 24 when periodically polled by the thermostat 24. In response to DR event information, the thermostat 24 may automatically adjust its energy settings to adjust energy consumption in the structure 28. In some embodiments, the DR server 48b may make DR event information available to energy management services users through the EMS server 48a. In such an embodiment, the thermostat 24 may connect with and/or through the EMS server 48a to be provided with DR event information from the DR server 48b.

Additionally or alternatively, the destination server ("W server") 48c may provide current weather information. In some embodiments the thermostat 24 may be connected with the W server 48c to obtain and display such information, e.g., as further described below. Also as further described below, a user may selectively initiate and/or terminate connection by the thermostat 24 with each destination server 48 individually. It should be noted generally that other or additional types of destination servers 48 could be selectively connected with the thermostat 24 in accordance with various implementations of the disclosure, to provide other or additional information, features and/or functionality to the thermostat 24. It also should be noted that although three destination servers 48 are shown in FIG. 1, in various embodiments a thermostat may be selectively connectable with more than three, or fewer than three, destination servers 48.

As previously mentioned, a homeowner may wish to employ a networking thermostat for various purposes, e.g., to participate in demand response programs, engage in energy management through an energy management services provider, receive weather information, etc. Such features and/or functions may be made available by and/or through servers such as the various destination servers 48. In various embodiments of the disclosure, a user may selectively cause the thermostat 24 to connect with and/or disconnect from any given destination server 48. The thermostat 24 may operate, e.g., as a TCP/IP client relative to one or more destination server(s) 48 with which it is connected. Such connections by the thermostat 24 with destination server(s) 48 may be on an intermittent basis, e.g., where the thermostat 24 periodically polls a given destination server 48 for connection with the given server 48 and the given server 48 expects to communicate with the thermostat 24 at predefined times. Thus the thermostat 24 may, e.g., periodically poll the DR server 48b and receive demand response event information and participate in DR events when the user has chosen to connect the thermostat 24 with the DR server 48b. Additionally or alternatively, if the user chooses not to participate in demand response, the user may provide input, as further described below, to the thermostat 24 to cause the thermostat 24 to send a disconnect message to the DR server 48b.

In various embodiments, the thermostat input means 76 includes one or more switches whereby the user may selectively cause the thermostat 24 to connect with one or more destination servers 48. In one example embodiment, one or more manual switches are provided whereby a user may select one or both of two options, e.g., obtaining energy management services and/or participating in DR events. In response to user input via the switch(es), the thermostat 24 connects with the EMS server 48a and/or with the DR server 48b. In some embodiments a menu is displayed on the display device 60 that includes a plurality of IP addresses, and/or descriptors for such addresses, for selection therefrom by the user. The user may activate a touch screen or other input means 76 to select from the menu an IP address of a destination server 48 with which the thermostat 24 is to connect or from which the thermostat 24 is to disconnect.

Where two or more destination servers 48 are selected for connection with the thermostat 24, the thermostat 24 may be configured to prioritize communications with the selected destination servers 48. For example, where the thermostat 24 is connected with the DR server 48b and also with the EMS server 48a while the thermostat 24 is participating in a DR event, the thermostat 24 may poll the DR server 48b more frequently than it polls the EMS server 48a.

It should be understood that there are many different ways in which to configure a thermostat for selective connection with one or more destination servers. For example, the home computer 52, smart phone or other remote user device 56, and/or thermostat 24 may be operative as "soft" access point(s) through which the thermostat 24 may obtain user selections of destination server(s) 48 and/or connect with destination server(s) 48. Client software and destination server addresses for demand response and for other or additional destination server-provided features and/or functions may reside in various locations, e.g., in the thermostat 24, the access point/router 32, the computer 52, remote user device 56, a destination server 48, in the cloud (i.e., distributed over various computing devices in the Internet 40,) etc.

In some embodiments, a thermostat may be configured to selectively connect with and disconnect from destination servers in accordance with some implementations of the disclosure, where no touch screen, keyboard, buttons or other thermostat user interface is needed. For example, a software application may be accessible, e.g., on or through a smart phone, tablet or other remote user device 56, the computer 52, etc. whereby the user may select between or among destination servers 48 for connection with or disconnection from the thermostat 24. One example method of providing a thermostat with a capability for connecting with and/or disconnecting from destination server(s) is indicated generally in FIG. 2 by reference number 100. In process 104, a user downloads or otherwise accesses a software application on a user device, e.g., the local computer 52, smart phone or other remote user device 56, etc., that has a user interface. In process 108, the software application displays a menu on the user interface of the user device. The menu provides a list, e.g., of thermostat features and/or functions that may be made available through destination servers. In process 112, the user selects, via the user interface, one or more of the features and/or functions. In process 116, the user device sends the user selections to the thermostat, e.g., by sending IP address(es) of destination server(s) corresponding to the selected feature(s) and/or function(s). In process 120, the thermostat connects with one or more destination servers corresponding to the user's selection, and in some embodiments may disconnect from any destination server corresponding to any feature and/or function that was not selected by the user.

It can be appreciated that there are many ways in which a user may be provided with capability to enter and change preferences for connecting a thermostat with one or more destination servers. In some embodiments, a user may enter or change such preferences via a user device and send the new and/or changed preferences via a remote access command to a server, which may be a destination server. The server may store the new and/or changed preferences and send them to the thermostat, which connects and/or disconnects with destination server(s) in accordance with the preferences.

In the foregoing embodiments, a connected networked thermostat with demand response capability allows a user to selectively turn on or off the demand response capability at the thermostat or via the network while retaining other connected functionality that the user may wish to retain. In various embodiments, control can be provided over connected functionality on a user's network without disruption, as expected by the user, while allowing the user, e.g., to opt out of participation in a demand response program or other unwanted connected functionality. Thus, users can tailor access as desired to energy management and/or demand response on their home networks. For example, exemplary embodiments include a thermostat or other controller having the ability to connect to two or more servers each for a specific function or purpose. The thermostat also has the ability to disable connection to one or more of the two or more servers as a function of a selection made by the user, e.g., to opt out of a demand response or reduction program offered by a utility or utility provider.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate control system controller for controlling operation of a climate control system of a structure, the climate control system controller comprising a processor, memory, and network interface configured to provide the climate control system controller with wireless network connectivity;
   wherein the climate control system controller is selectively connectable, in response to user input, with each of a plurality of destination servers remote from the structure, each destination server being user-selectable for connection with the controller to provide a particular capability, feature, and/or function pertinent to controlling operation of the climate control system, each destination server having an address pre-designated in the climate control system for use by the controller for connecting with the destination server;
   a particular one of the destination servers being a demand-response server of an energy provider, the demand-response server being selectively connectable with the controller to provide the controller with demand-response capability without the controller having to connect with the demand-response server through another of the destination servers.

2. The climate control system controller of claim 1, wherein the climate control system controller is configured to participate in a demand response event when connected with the particular one of the destination servers.

3. The climate control system controller of claim 1, wherein the climate control system controller is connected in a user network that includes a computer having a user interface, and the climate control system controller is configured to receive the user input via the user interface and computer.

4. The climate control system controller of claim 1, wherein the climate control system controller is configured to receive the user input via a smart phone and/or tablet.

5. The climate control system controller of claim 1, comprising a switch that is user-operable to provide the user input.

6. The climate control system controller of claim 1, wherein the climate control system controller is configured to receive the user input via a remote access command and one of the destination servers.

7. The climate control system controller of claim 1, wherein the climate control system controller is configured to receive weather-related information when connected with one of the destination servers.

8. The climate control system controller of claim 1, comprising a thermostat.

9. A computer-performed method of controlling a climate control system, the method comprising the steps of:
- receiving a user selection of one of a plurality of remote destination servers with which a climate control system controller is configured to establish and/or terminate connections, each destination server being user-selectable for connection with the controller to provide a particular capability, feature, and/or function pertinent to controlling operation of the climate control system, each destination server having an address pre-designated in the climate control system for use by the climate control system controller for connecting with the destination server; and
- in accordance with the user selection, establishing or terminating a connection between the selected destination server and the climate control system controller;
- wherein the selected destination server is a demand-response server of an energy provider, the method further comprising establishing or terminating the connection to enable or disable participation by the climate control system controller in a demand response event, without having to perform the establishing or terminating of the connection through another of the destination servers.

10. The method of claim 9, wherein at least the establishing or terminating is performed by the climate control system controller without disconnecting a connection between the climate control system controller and a second selected destination server.

11. The method of claim 9, further comprising the climate control system controller controlling operation of the climate control system in accordance with the establishing or terminating.

12. The method of claim 9, performed without disabling access by the climate control system controller to another of the destination servers.

13. The method of claim 9, wherein receiving the user selection comprises receiving input via one or more of the following: a user-operable switch of the climate control system controller, a user interface of a computer wirelessly connected with the climate control system controller, a tablet, and a smart phone.

14. The method of claim 9, comprising establishing or terminating a connection between the climate control system controller and a second selected destination server to enable or disable receipt by the climate control system controller of weather-related information from the selected destination server.

15. A thermostat for controlling operation of a climate control system of a structure, the thermostat comprising a processor, memory, and network interface configured to provide the thermostat with wireless network connectivity with a plurality of destination servers, each destination server being user-selectable for connection with the thermostat to provide a particular capability, feature, and/or function pertinent to controlling operation of the climate control system, each destination server having an address pre-designated in the climate control system for use by the thermostat for connecting therewith, such that the thermostat: (a) in response to user input selecting one of a plurality of capabilities, features and/or functions of the thermostat, is connectable with a first destination server that provides the selected capability, feature and/or function, and (b) is selectively disconnectable from a second destination server providing demand-response participation as another of the plurality of capabilities, features and/or functions, where the second destination server is a demand-response server of an energy provider;
- the thermostat being connectible with the first destination server independent of whether or not the thermostat is connected with the second destination server.

16. The thermostat of claim 15, wherein the processor, memory, and network interface are configured to receive the user input via one or more of the following: a user-operable switch of the thermostat, a user interface of a computer wirelessly connected with the thermostat, a tablet, and a smart phone.

17. The thermostat of claim 15, selectively connectable to one or more of the destination servers via a server of an energy management services provider.

18. The thermostat of claim 15, configured to receive the user input via a remote access command and one of the destination servers.

19. The thermostat of claim 18, wherein the one of the destination servers includes a server of an energy management services provider.

* * * * *